Inventors:
George C. Fenn,
Joseph Trope,

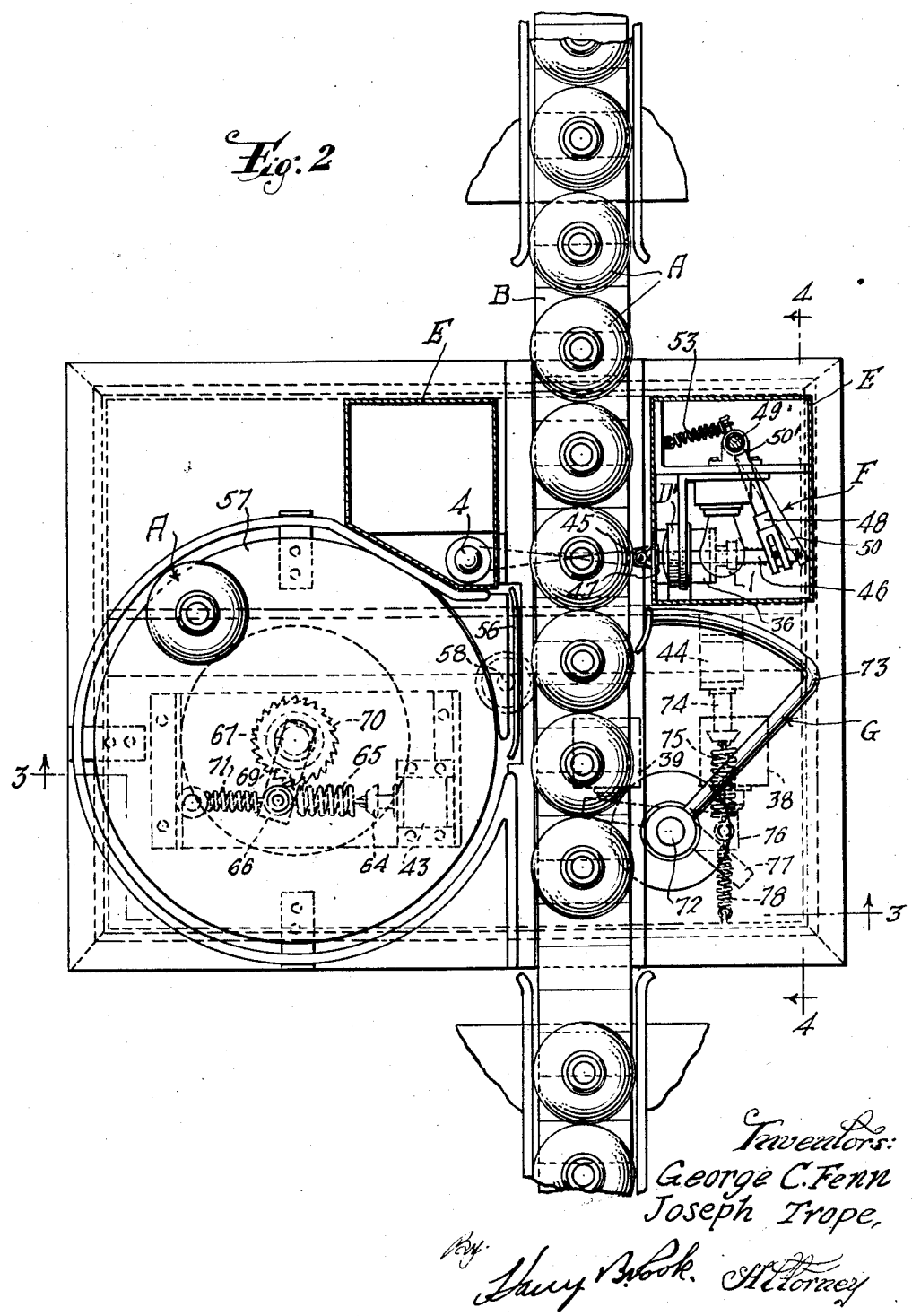

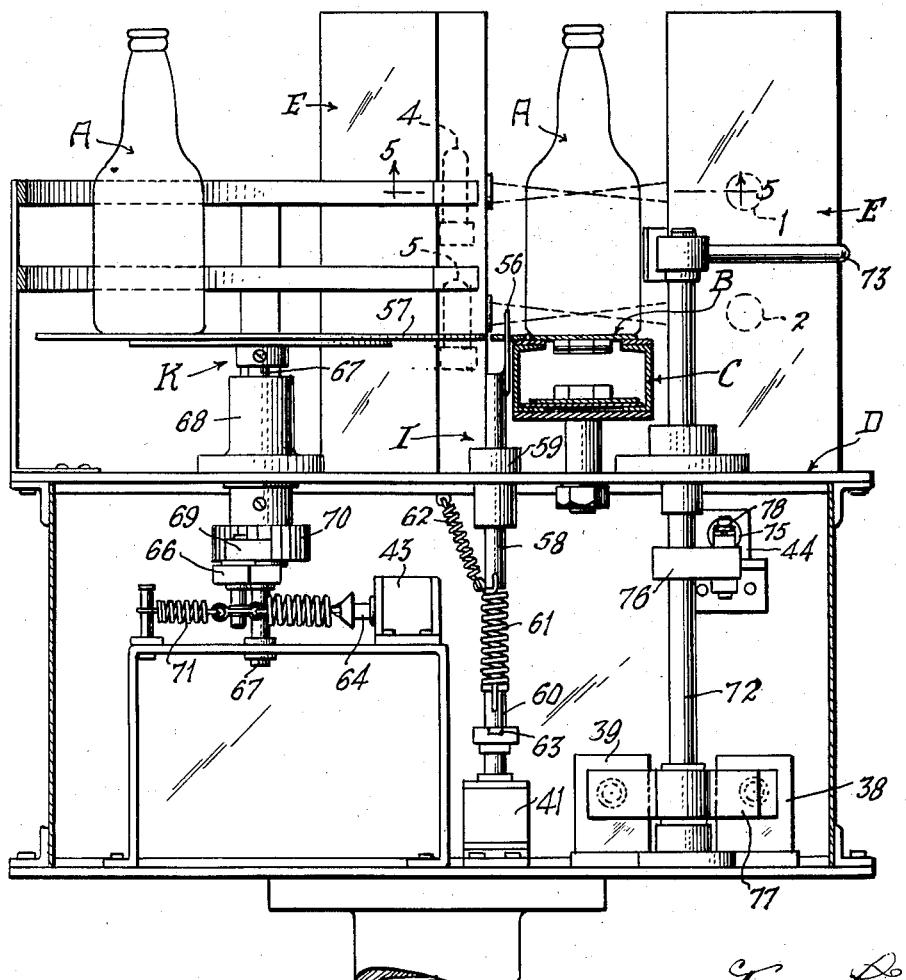

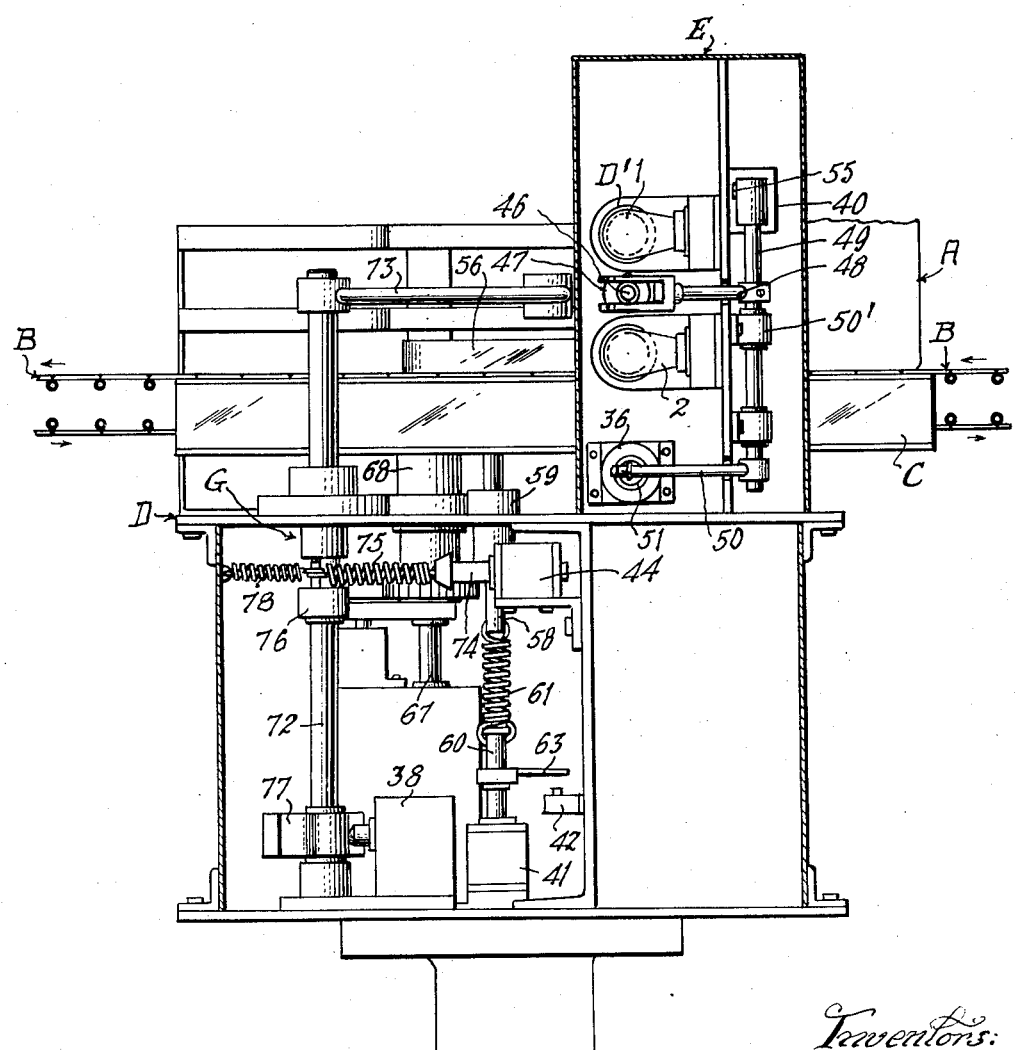

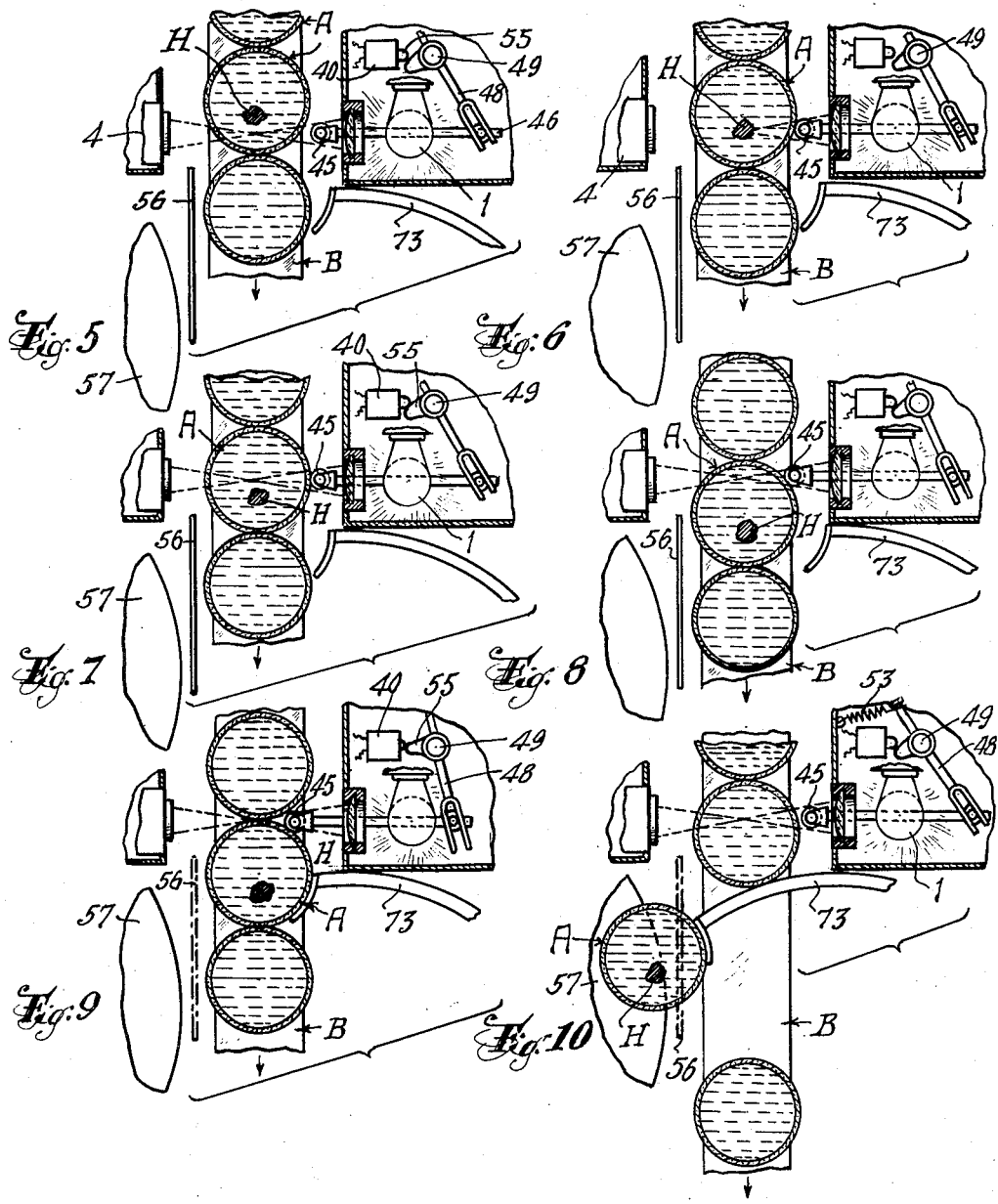

United States Patent Office 2,945,588
Patented July 19, 1960

2,945,588

BOTTLE INSPECTION APPARATUS AND METHOD

George C. Fenn, 219 Linden Ave., Verona, N.J., and Joseph Trope, 12 Evelyn Place, Hanover, N.J.

Filed Mar. 1, 1957, Ser. No. 643,331

12 Claims. (Cl. 209—111)

This invention relates to apparatus including a photoelectric device for ascertaining whether foreign matter is present in transparent or translucent bottles, and one object of the invention is to provide a novel and improved construction, method and arrangement wherein a plurality of light sources and a photoelectric device responsive to light rays from each source are disposed relatively to means for moving the containers to be inspected in succession in a path between said light sources and said cells so that the light beams from said sources will pass through different portions of each container and if the container is clean or has no relatively opaquue matter, the photo-electric cells will be equally energized, while if the bottle is not clean or contains foreign or relatively opaque matter, a portion of the light from one of the beams is intercepted by said foreign or opaque matter and the photo-electric cells will be unequally energized, said photo-electric cells being connected in an electric circuit with mechanism to be actuated upon variations in current flow in the photo-electric circuit, for example mechanism for controlling ejection of the unclean bottle from said path.

Another object is to provide a novel and improved construction, combination and arrangement of such a photo-electric inspection system and means for controlling the ejection of the unclean container from the row or file of containers under inspection.

A further object is to provide a container inspection apparatus of this character which will inspect containers of different color densities without causing false ejection of containers by mixed colors, tints or hues of the containers.

Still another object is to provide such an apparatus wherein all movable parts, except the means for conveying the containers past the photo-electric system, shall be at rest during the inspection of the containers and said movable parts of the apparatus are set in motion only when a container having foreign matter has been detected and is to be ejected.

It is another object of the invention to provide such apparatus which will inspect either completely empty containers or filled containers without the necessity for rotating the containers or causing a whirling motion of the contents of the containers as is taught, for example, by Patents Nos. 2,427,319 and 2,426,355.

A still further object of the invention is to provide apparatus of this character in which each light source and the corresponding photo-electric cell will inspect the entire container from one side to the other, as contrasted with the inspection in succession of separate zones of a container with a photo-electric system for each zone as taught by Patent No. 2,137,187.

Other objects of the invention are to provide a simple high speed and inexpensive machine which will inspect containers many times faster than known container-inspection machines and at a small fraction of the cost; and to obtain other advantages and results that will be brought out by the following description in conjunction with the accompanying drawings in which—

Figure 2 is a top plan view of the apparatus with portions broken away and shown in section;

Figure 3 is a vertical sectional view approximately on the plane of the line 3—3 of Figure 2;

Figure 4 is a vertical sectional view approximately on the plane of the line 4—4 of Figure 2;

Figure 5 is a fragmentary horizontal sectional schematic view approximately on the plane of the line 5—5 of Figure 3 showing one step in the inspection of a bottle;

Figure 6 is a similar view showing the next step in the inspection;

Figure 7 is a like view showing the next succeeding step;

Figure 8 is a similar view showing the next following step;

Figure 9 is a similar view showing the last step in the inspection of the bottle; and Figure 10 is a view like Figure 9 showing the ejection of the detected and rejected bottle.

Figure 1:
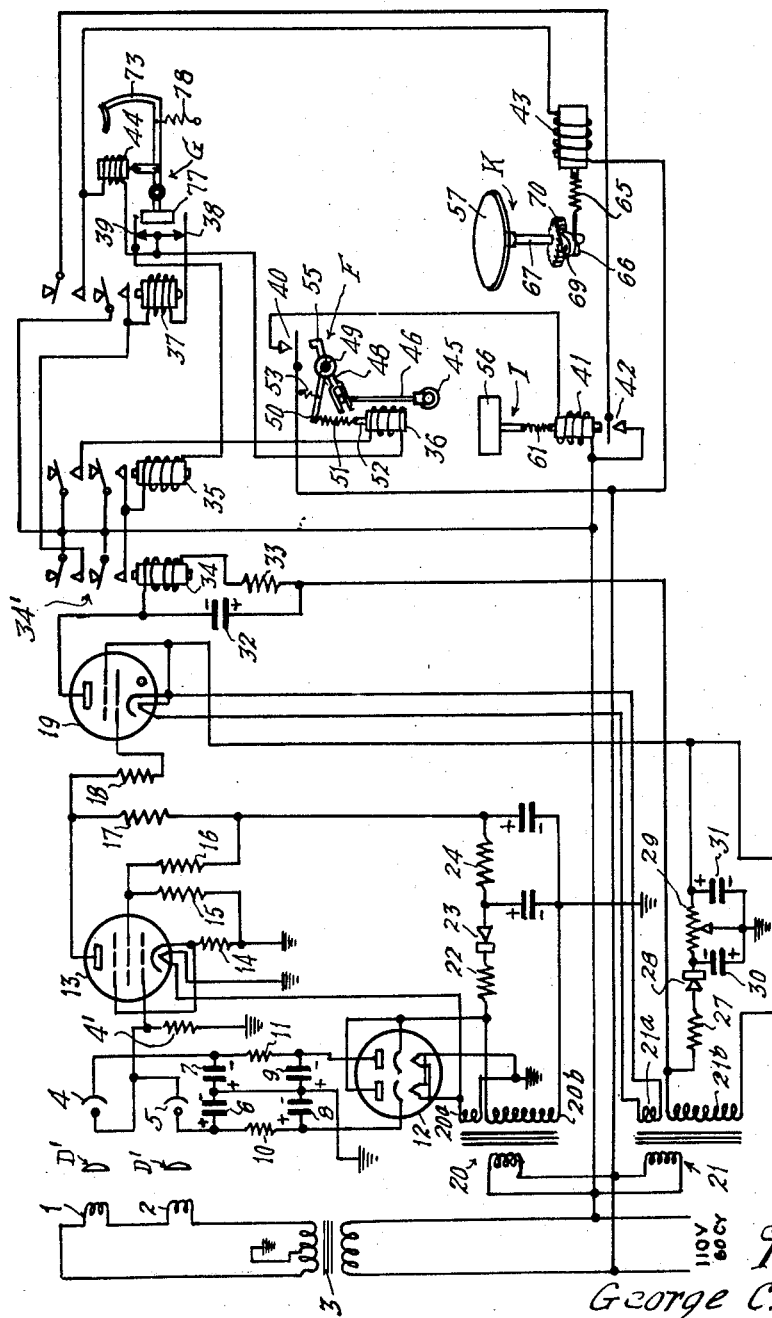
Figure 1 is a schematic view and wiring diagram of a bottle inspection apparatus embodying the invention.

As hereinbefore mentioned, an important feature of the invention is the novel and improved construction and arrangement of a plurality of light sources such as electric lamps and a photo-electric cell or tube for each light source, relative to the path of movement of containers to be inspected so that when the containers are clean, no current flows in the photo-electric circuit which is therefore dormant, while when light from one of the lamps is intercepted by foreign matter, the current produced by the corresponding photo-electric tube is reduced so that current will flow in the photo-electric circuit that constitutes a detection circuit to detect foreign or relatively opaque matter carried by the transparent or translucent containers.

While different circuitry may be utilized for achieving this result, for the purpose of illustrating this invention we have shown in Figure 1 one circuit. Two 6 v.—32 C.P. lamp bulbs 1 and 2 provide the two light sources of invisible and infra red ray energy. Preferably photo-electric cells are chosen which will operate at peak at about 7000 angstrom units and are sensitive to infra red energy and visible light. Infra red energy from the light source is not absorbed by dark colored containers and continues on through the container to energize the photo-cells. Five and one-half volts is supplied to said lamps through a transformer 3 from a 110 volt, 60 cycle supply line. Cooperating with the light sources 1 and 2 for detecting foreign matter in the containers are the respective photo-electric tubes 4 and 5. A filter network for the negative supply of the photo-cell 4 which may be type 917 tube, comprises two condensers 7 and 9 of about 10 mfd. each, and a 22K resistor 11. The filter network for the positive supply of the photo-cell 5 which is preferably type 919, includes the 10 mfd. condensers 6 and 8 and a 22K resistor 10. Power supply of 6.3 v. for the heater of a tube 13 of the 6AU6 type is supplied through winding 20a of a transformer 20 and so is supplied the heater of a tube 12 of the 6H6 type. Winding 20b is the high voltage winding of 115 volts which supplies power through a 50 ohm resistor 22 to selenium rectifier 23 and thence to a 22K resistor 24 and 40 mfd. condensers 25 and 26. The tube 13 has a 1K cathode resistor 14 and a 100K plate load resistor 17, and the screen voltage is supplied by a resistance divider network of a 22K resistor 15 and a 33K resistor 16. The heater of tube 19 of the 2D21 type has its 6.3 v. power supplied from transformer 21 through winding 21a. The 115 v. winding 21b provides plate supply current for said tube 19. The plate load for the tube 19 is shown as comprising a 2 mfd. condenser 32, a 5K resistor 33 and a relay 34 having a 5000 ohm coil at 5 milliampere pull-in rating. The output of the plate of tube 13 is connected to the tube 19 with a 50K resistor 18 which protects the tube from overload. The transformer winding 21b also provides 115 v. to the bias supply of the tube 19, the bias unit being shown as comprising a 50 ohm resistor 27, a selenium rectifier 28, a sensitivity potentiometer 29 of 25K rating and two 20 mfd. condensers 30 and 31.

Winding 20b provides 115 volts to the double diode rectifier tube 12 and is connected as a half wave voltage doubler which provides both negative and positive voltage in relation to ground.

The negative and positive voltages applied to the photo-cells 4 and 5 prevent current flow through the 40 megohm resistor 4' to ground, as long as photo-cells 4 and 5 are receiving the same amount of light. If the lower tube receives less light than the other, as would be the case when foreign matter is at the bottom of the container passing between the light source and the tube, current will flow through resistor 4' and develop a voltage across said resistor, thereby causing a change in the plate current in the amplifier tube 13. This change in plate current causes a change in plate voltage in the tube 13, which in turn varies the grid voltage in the tube 19, allowing this tube to fire. This causes relay 34 to close. A 2 mfd. condenser 32 and a 5K resistor 33 constitute timing constants which hold the relay closed for five hundredths seconds.

The energization of the low power relay 34 closes contacts generally designated 34' which directs 110 v. current to self-holding relays 35 and 37. Each of these relays when energized momentarily, will keep itself energized by feeding current to itself through a set of contacts which it closed during this momentary period of energization. These relays control the circuits for the container ejecting apparatus which will now be described.

As shown, the transparent or translucent containers such as bottles A are moved in succession in file formation by a conveyor belt B of any suitable construction that is mounted on a guide track C which is in turn mounted on a main frame structure D. The bottles are thus moved in a straight path, standing vertically on the conveyor. At one side of the path of movement are arranged the two light sources 1 and 2 that are shown as electric lamps. Preferably, the lamps are of a nature to emit both infra red and visible light rays so that they may be used when desired to inspect dark colored containers, which will be penetrated by infra red rays but can not be penetrated by visible light rays. The lamps are shown as disposed in vertical spaced relation so as to be juxtaposed to the lower and upper portions of the bottles as the latter pass the lamps. At the opposite side of the path of movement of the containers and opposite to the respective lamps 1 and 2 are the photo-electric tubes 4 and 5 so that the light rays will be transmitted from the lamps through the bottles to the respective photo-electric tubes. Preferably, suitable lenses D' are provided for properly focusing the light rays. The lamps, lenses and tubes are arranged in suitable casings or towers E for protection, the walls of the towers having appropriate openings for the passage of light rays.

Located between the light sources is a sensing wheel mechanism generally designated F which controls the operation of a bottle ejecting mechanism G and serves also to hold back the oncoming bottles until the ejection cycle is completed.

The sensing wheel mechanism includes a wheel 45 mounted at one end of a rod 46 that is slidably mounted in a bearing 47 in the main frame and has a pin and slot connection with an arm 48 that is rigidly connected to a shaft 49 which is journaled in suitable bearings 50' on the frame structure. The shaft 49 has another arm 50 that is connected by a spring 51 to the plunger or armature 52 of a solenoid supply of current to which is controlled by the relay 35. A light tension spring 53 normally holds the arm 48 and the armature 52 in retracted position with the sensing wheel retracted out of the path of movement of the containers A as shown in Figure 5. When a container containing relatively opaque foreign matter or particles H passes between the light sources and the photo-electric tubes, the interception of some of the light rays by said opaque or foreign matter causes the detection circuit to energize the solenoid 36, whereupon the armature is pulled into the solenoid and applies tension to the spring 51 so as to cause rotation of the shaft 49 and actuation of the rod 46 to project the sensing wheel 45 against the side of the container. Further rotation of the shaft 49 is then prevented and the sensing wheel will follow the contour of the outer surface of the wall of the container as the container continues to move through the light rays as shown in Figures 6-8 inclusive. As the container continues its movement the wheel will be pushed outwardly to the full limit of its movement by the spring 53 as shown in Figure 9. The wheel will then hold back the oncoming bottles, and cam 55 will actuate the switch 40 which controls a gate mechanism I which in turn controls the movement of an unclean bottle from the conveyor onto a take-off or discharge mechanism generally designated K. The gate mechanism includes a gate plate 56 that normally projects upwardly above the plane of the conveyor B between the path of movement of the containers and a take-off table 57 disposed at one side of the conveyor to receive rejected bottles from the conveyor. The gate plate is mounted on a rod 58 that is vertically slidable in a bearing 59 in a machine frame and has one end connected to the armature or plunger 60 of a solenoid 41 by a tension spring 61 which also serves as a push rod, the gate being held in normal projected position by a light tension spring 62. When the switch 40 is closed by the sensing wheel mechanism, the solenoid 41 is energized so as to pull down the gate plate 56 and permit the unclean rejected bottle to be pushed from the conveyor onto the take-off table 57. When the gate has been pulled to the limit of its downward movement, a finger 63 on the plunger or armature 60 actuates a switch 42 which controls the operation of the take-off or discharge mechanism K.

The switch 42 is connected in circuit with a solenoid 43, the armature or plunger 64 of which is connected by a spring 65 to a pawl lever 66 which is pivoted on a shaft 67 journaled in a bearing 68 in the machine frame and carrying the take-off table 57 at its upper end. The pawl lever carries a pawl 69 which cooperates with a ratchet 70 fixedly connected to the shaft 67. When the solenoid 43 is energized the plunger swings the pawl lever so as to rotate the table 57 one step in one direction to move a bottle on the table away from the gate 56, and the return movement of the pawl is effected by a tension spring 71.

The relay 37 which was previously closed by the contacts of relay 34 could have operated the ejector mechanism solenoid 44 and the table rotating solenoid 43 but did not do so because one line was open at switch 42. When the gate operates the switch 42 the solenoids 44 and 43 are energized; that is, simultaneously with the energization of the solenoid 43 by the switch 42, the solenoid 44 is also energized to operate the container ejecting mechanism G. This mechanism is shown as comprising a vertical shaft 72 journaled in the machine frame D and having an ejector arm 73 at its upper end. The plunger 74 of the solenoid 44 is connected by a tension spring 75 to an arm 76 on the shaft 72 so that as the solenoid is energized, the shaft is rotated to swing the ejector arm 73 into engagement with the detected unclean bottle or container as shown in Figure 9, and across the conveyor B as shown in Figure 10 to push the container onto the take-off table 57. The ejector arm in this position also prevents advance of the succeeding containers if and when the wheel 45 should fail to stop the containers. When the ejector arm has completed its stroke a cam 77 on the shaft 72 opens switch 38 thereby breaking the circuit to the relay 37. The relay 37 being then deenergized, opens the contacts supplying power to the solenoid 44 and permits the ejector arm to be returned to its normal position by tension spring 78.

When the ejector arm is withdrawn to its normal position its momentum causes it to overtravel and open switch 39 which in turn opens the circuit to the holding relay 35. The relay 35 being then deenergized permits contacts to open and release solenoid 36, whereupon the sensing wheel is retracted, releasing the bottle flow and the switch 40 is opened to release the gate plate 56 into its normal position as shown in Figures 3 and 5.

The apparatus is then in condition to detect the next unclean bottle on the conveyor.

It will be observed that all of the movable parts of the apparatus are at rest at all times except when an unclean bottle is detected, and the photo-electric circuit is dormant at all times except when one of the light beams is intercepted by foreign matter or a relatively opaque light-obstructing defect such as an abnormal difference in wall thickness in a container. Different colors in the walls of the transparent or translucent containers and refraction or impedance of the light beams do not disturb the balance of the photo-electric circuit because both of the photo-electric cells are energized by the same amount of light, but foreign matter in a bottle will be quickly detected and the bottle will be rapidly ejected from the line of containers in a simple and rapid manner. The signals produced by the photo-cells are amplified as much as one hundred times by the amplifying circuit including the tube 13 so that the detecting system is highly sensitive and the operation of the ejecting mechanism is powerful and reliable.

It will be understood that one purpose of the spring 61 in the gate mechanism is to avoid damage to the apparatus in case of operation of the solenoid while movement of the gate is obstructed by broken glass or the like.

The sensing mechanism follows the container and precents actuation of the ejecting mechanism until the container has reached the proper position for ejection, which is especially desirable because the containers do not always travel at a uniform speed on the conveyor, due, for example, to line stops and slippage. Also, the mechanism readily adapts the machine for use with a conveyor running at either high or low speed and with different conveyors running at different speeds.

Obviously more than two light sources and two photocells may be utilized with proper circuit modifications.

Preferably, the lens systems D' are of the type to produce converging light beams with their focal points lying in the common central plane of the containers as they are moved in file formation through the light beams by the conveyor B, for example, as shown in Figures 2, 3 and 5 through 10, so that the leading portion of the vertical wall of each bottle will gradually enter the beam at the focus or at the point of convergence of the light rays, as shown in Figure 9, and the container wall will not obstruct the passage of light rays sufficiently to cause ejection of the container. However, the lens systems D' could be modified to produce a non-converging parallel beam when desired.

While the invention has been shown and described as embodied in certain structural details, it should be understood that this is primarily for the purpose of illustrating the principles of the invention and that many modifications and changes may be made in the construction of the apparatus within the spirit and scope of the invention.

What we claim is:

1. A container inspection apparatus to be used in connection with a conveyor for transparent or translucent containers, comprising in combination: a plurality of photo-electric cells for positioning adjacent one side of a container conveyor, light-producing means for positioning at the other side of said conveyor opposite said photo-electric cells and providing a plurality of separate light beams corresponding in number to said photo-electric cells with one beam for each photo-electric cell, to simultaneously direct said beams on their respective cells through different portions of the containers while the containers are in translatory motion on said conveyor; an electrical detection circuit interconnecting said cells and providing for no flow of current in said circuit during movement through said light beams of a transparent or translucent container devoid of relatively opaque matter and providing for current flow in said circuit when light in one of said beams is intercepted by relatively opaque matter carried by a container moving through said beams.

2. In apparatus as defined in claim 1, the addition of ejecting means connected in said circuit for displacing from said conveyor a container having foreign matter, and an electrical device actuated upon flow of current in said photo-electric circuit for controlling said ejecting means.

3. In apparatus as defined in claim 1, the addition of an amplifier circuit for amplifying said current in the photo-electric circuit, and an electrical device connected in circuit for actuation by the current from said amplifier circuit.

4. In apparatus as defined in claim 1, the addition of an amplifier circuit for amplifying said current in the photo-electric circuit, and an electrical device connected in circuit for actuation by the current from said amplifier circuit, and ejecting means controlled by said electrical device for displacing from said conveyor a container having foreign matter.

5. In apparatus as defined in claim 1, the addition of an amplifier circuit for amplifying said current in the photo-electric circuit, a holding relay energized by current from said amplifier circuit, a sensing mechanism including a sensing wheel normally located out of said conveyor at one side thereof, means controlled by said holding relay for actuating and holding said sensing wheel into contact with a container moving with said conveyor until that container has passed through said light beams, and an ejecting mechanism activation of which is controlled by said sensing mechanism as said container has passed through and beyond said light beams for displacing from said conveyor a container having foreign matter.

6. In apparatus as defined in claim 1, the addition of an amplifier circuit for amplifying said current in the photo-electric circuit, and an electrical device connected in circuit for actuation by the current from said amplifier circuit and ejecting means controlled by said electrical device for displacing from said conveyor a container having foreign matter, and a movable take-off table to receive a displaced container from said conveyor, and means controlled by said ejecting mechanism upon movement thereof to displace a container for moving the take-off table to convey the containers thereon away from said path.

7. In apparatus as defined in claim 1, a conveyor for moving containers having cylindrical side walls in said path, and said light beams and said light-sensitive devices spaced apart in a plane parallel to said cylindrical walls so that said walls shall both enter and leave both light beams simultaneously.

8. A container inspection apparatus as defined in claim 1 wherein said separate light beams are in spaced apart relation to each other in a common vertical plane that is transverse of said path and said photo-electric cells are also disposed in spaced apart relation to each other in said plane.

9. A container inspection apparatus as defined in claim 1 wherein said light beams are converging beams with their focal points in the common central plane of said containers as they are moved by said conveyor between said light beams, and said photo-electric cells are also disposed in spaced apart relation to each other in said plane.

10. A radiant energy device adapted to straddle a travelling conveyor, for continuously inspecting transparent or translucent containers for foreign matter which may be carried thereby while the containers are in translatory motion on said conveyor, comprising in combination: an instrumentality for positioning adjacent one side of a travelling conveyor which provides a plurality of separate beams of light vertically spaced in line with each other; adjusting means associated with said instrumentality whereby said beams may be vertically and independently adjusted; a plurality of vertically spaced photo-electric cells positioned adjacent the other side of said conveyor in position whereby each of said cells is adapted to receive a separate beam of light emitted by said instrumentality; a detection circuit connecting said cells whereby when a container of different colors or shape carrying no foreign matter passes through the light beams, the light effect on the photo-electric cells causes the output of one cell to neutralize the output of the other cell so that the detection circuit is in balance, and an ejecting mechanism including an ejecting circuit and connected to and controlled by the detection circuit, whereby when foreign matter carried by a container interrupts or affects light transmission of one of said beams, the detection circuit is thrown out of balance and is activated to cause the ejecting mechanism to eject said container from the conveyor.

11. The method of inspecting transparent or translucent containers which comprises: continuously moving the containers through two relatively stationary separate beams of light and causing each light beam to impinge on a separate relatively stationary photo-electric device as the beams pass through the containers; causing the outputs of said photo-electric devices to be balanced when the beams of light normally passing through the containers are not interrupted by opaque matter in or on a container and to become unbalanced when one of said beams is interrupted by opaque matter in or on a container, and detecting the unbalancing of said outputs to thereby show the presence of said opaque matter.

12. The method of inspecting transparent or translucent containers which comprises: continuously moving the containers in line through a plurality of relatively stationary beams of light and causing each light beam to impinge on a separate relatively stationary photo-electric device as the beams pass through the containers; causing the outputs of said photo-electric devices to be balanced when the beams of light normally passing through the containers are not interrupted by opaque matter in or on a container and to become unbalanced when one of said beams is interrupted by such opaque matter, and causing the container bearing such opaque matter to be removed from the line of movement of the remaining containers while they are in motion and when said photo-electric devices become unbalanced.

References Cited in the file of this patent

UNITED STATES PATENTS

| | | |
|---|---|---|
| 2,132,447 | Stout | Oct. 11, 1938 |
| 2,137,187 | Stoate | Nov. 15, 1938 |
| 2,192,580 | Sachtleben | Mar. 5, 1940 |
| 2,352,091 | Fedorchak et al. | June 20, 1944 |
| 2,800,226 | Drennan | July 23, 1957 |